Dec. 10, 1929. A. JØRGENSEN 1,739,465
MACHINE FOR AUTOMATIC CUTTING OF RECESSES OR THE LIKE
IN STRAIGHT OR CURVED DIRECTION ON SURFACES
Filed Aug. 20, 1923 2 Sheets-Sheet 1

Inventor
A. Jørgensen
by Langner, Parry, Card & Langner
Att'ys.

Dec. 10, 1929.  A. JØRGENSEN  1,739,465
MACHINE FOR AUTOMATIC CUTTING OF RECESSES OR THE LIKE
IN STRAIGHT OR CURVED DIRECTION ON SURFACES
Filed Aug. 20, 1923  2 Sheets-Sheet 2

Inventor
A. Jørgensen
by Langner, Parry, Card & Langner
Att'ys.

Patented Dec. 10, 1929

1,739,465

UNITED STATES PATENT OFFICE

AXEL JØRGENSEN, OF COPENHAGEN, DENMARK, ASSIGNOR TO A. JØRGENSEN & CO., OF COPENHAGEN, DENMARK

MACHINE FOR AUTOMATIC CUTTING OF RECESSES OR THE LIKE IN STRAIGHT OR CURVED DIRECTION ON SURFACES

Application filed August 20, 1923, Serial No. 658,453, and in Denmark September 6, 1922.

This invention relates to an improved machine for automatically cutting curved grooves of progressively increasing curvature in the surface of cylindrical or conical millgrinders without the use of dividing means. In accordance with the invention a reciprocating cutting tool is combined with a rotary support to which the work piece is clamped and with means for intermittently rotating said support with progressively increasing speed always in the same direction in such a manner, that during each cutting stroke the support is moved forward an angle of such a size that the tool is caused to cut the grooves with intervals greater than the intervals between the grooves of the finished work, and that the tool after each completed revolution of the work piece will meet untreated portions of said work piece until all the grooves are cut.

The means used for intermittently rotating the work piece consist preferably of a ratchet wheel fixed to the support for the work piece and a reciprocating pawl which during its forward stroke intermittently rotates said ratchet wheel with progressively increasing speed always in the same direction, the number of teeth of said ratchet wheel being either a prime number or a prime number multiplied by 2 so that the number of teeth the pawl is moved backwards for each backward stroke has no factor or only the factor 2 common with the number of teeth of said ratchet wheel.

In the accompanying drawing forming part of this specification.

Figures 6 and 7 show a plan view and an end elevation respectively of a constructional form of the cutting device together with a work piece in which the machine has commenced the cutting of a curved groove.

Figure 1:
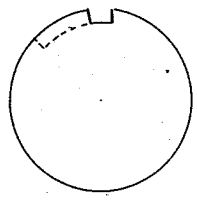
Figures 1 and 2 show an end view and an elevation respectively of a work piece having a curved groove.
Figure 3:
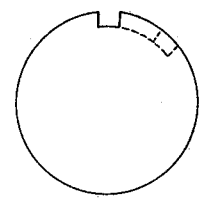
Figures 3 and 4 show corresponding views of a work piece having a groove curving to the opposite side of the groove shown in Figures 1 and 2.
Figure 2:
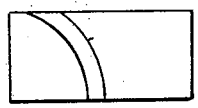
Figure 4:
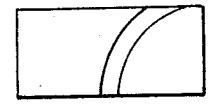

In the constructional form shown in Figures 6 and 7, 21 designates a frame connected with the fixed base of the machine (not shown in the drawing) and having bearings for a shaft 22 carrying the work piece B and a bevel gear 23 engaging another bevel gear 24 on a shaft 25 mounted in the frame 21 and carrying also a ratchet wheel 26. The ratchet wheel 26 and thereby the bevel gears 24 and 23 and the shaft 22, which forms support for the work piece B are intermittently rotated with progressively increasing speed and always in the same direction by a pawl G carried by a lever arm 27 freely on the shaft 25. Said lever arm is by means of a connecting rod 28 connected to the reciprocating tool holder 29 which rod 28 of course is reciprocated in timed relation to said tool holder which in turn is reciprocated from the machine by any well known means not shown in the drawing. During its forward stroke the connecting rod moves forward with approximately constant speed thereby causing the pawl G to turn the ratchet wheel with a progressively increasing speed as the angle of rotation corresponding to the horizontal projection of the linear movement of the connecting rod progressively increases. In order to vary the stroke of the pawl G the rod 28 is connected to the lever arm 27 by means of a pin which is movable in a slot 30 in said lever arm and can be fixed in desired position to said lever arm by a suitable lock nut.

In order that the cutting tool shall not cut out the grooves to its full depth in one stroke the frame 21 is so mounted that it may be lifted automatically a certain distance relatively to the machine frame as indicated by the vertical arrow II in Fig. 7, until the cutting tool has cut all the grooves to the desired depth.

Figure 5:
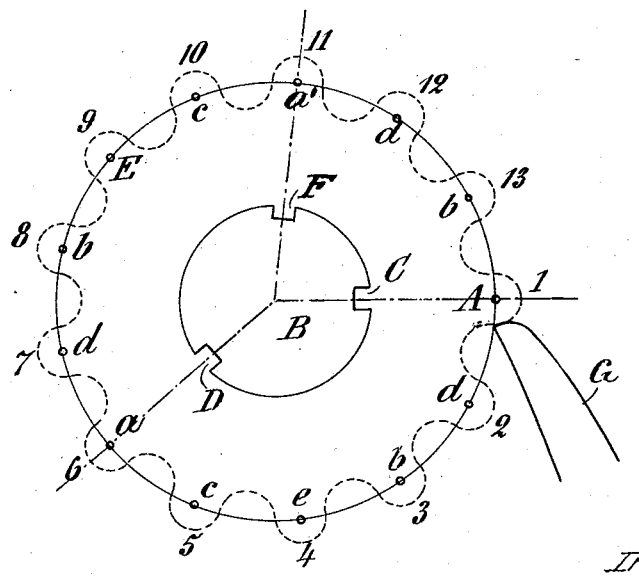
Figure 5 is a diagrammatic view indicating the distribution of the grooves successively cut around the surface of the work.

Fig. 5 shows by way of example a ratchet wheel with thirteen teeth and the movement of the pawl is thought to be so adjusted that the pawl takes five teeth every backward stroke.

While the cutting tool has cut out the grooves C in the work piece B the pawl G has engaged the tooth designated 1, A. When the groove C has been cut the pawl moves the teeth backward and engages the tooth five teeth backward and engages the tooth 6, a. The next time the pawl will engage the tooth 11, a. During the first complete revolution of the work piece there will be cut these three grooves designated C, D, and F, corresponding to the pawl G having engaged the three teeth A, a a¹. During the continued cutting the work piece B is revolved as many times as the pawl takes teeth each time i. e. five, whereafter all the grooves have been cut and evenly distributed over the surface of the work piece. Thirteen grooves being cut in all while the pawl turns the ratchet wheel, in the example shown five revolutions, so that the first revolution causes contact between the pawl and the teeth designated A and a, the second revolution contact with the teeth designated b, third with the teeth designated c, fourth and fifth with those designated d and e until finally the contact corresponding to the last groove takes place at the tooth designated 9, E. Hereafter the whole process will be repeated.

By adjusting the connection between the lever arm 27 (Fig. 7) and the connecting rod 28 the pawl can be adjusted to take a greater or lesser number of teeth at each backward stroke, so that the revolution given to the work piece during the cutting stroke will be more or less rapid according to the number of teeth taken by the pawl at each stroke and consequently the curvature of the groove will be accordingly varied.

When the number of teeth of the ratchet wheel as previously stated is a prime number then the cutting tool will not return to a previously cut groove until all grooves have been cut which is due to the fact that the number of teeth of the ratchet wheel and the number of teeth taken by the pawl during each stroke have no common factor. If the number of teeth of the ratchet wheel is a prime number multiplied by 2 and the pawl takes an odd number of teeth each time will also be cut as many grooves as the ratchet wheel has teeth. If then it is desired to work one-half of the recesses once more, e. g. by another cutting tool, the pawl motion is so adjusted that this second time the pawl takes an even number of teeth and the result will be that only one-half of the grooves is worked once more.

I claim:

1. In a machine for automatically cutting grooves in the surface of cylindrical or conical mill-grinders, a reciprocatory tool holder, a work support, a shaft on which said work support is mounted, means for intermittently imparting uni-directional rotation to said work support from said tool holder comprising a connecting rod connected directly to said tool holder, a pivotally mounted lever to which said connecting rod is pivotally connected, for oscillating said lever, a shaft, a ratchet wheel on said shaft, a pawl carried by said lever and engageable with teeth on said ratchet wheel for imparting uni-directional movement to said ratchet wheel on the cutting stroke only of said tool holder, and a gear on said shaft intermeshing with a gear on the shaft of said work support for transmitting uni-directional movement to the latter.

2. In a machine for automatically cutting grooves in the surface of cylindrical or conical mill-grinders, a reciprocatory tool holder, a work support, a shaft on which said work support is mounted, means for intermittently imparting uni-directional rotation to said work support from said tool holder comprising a connecting rod connected directly to said tool holder, a pivotally mounted lever to which said connecting rod is pivotally connected, for oscillating said lever, a shaft, a ratchet wheel on said shaft, a pawl carried by said lever and engageable with teeth on said ratchet wheel for imparting uni-directional movement to said ratchet wheel on the cutting stroke only of said tool holder, and a gear on said shaft intermeshing with a gear on the shaft of said work support for transmitting uni-directional movement to the latter, and means for adjusting said connecting rod translatorily with respect to said oscillating lever.

In testimony whereof I affix my signature.

AXEL JØRGENSEN.